United States Patent
Okada et al.

(10) Patent No.: US 7,565,235 B2
(45) Date of Patent: Jul. 21, 2009

(54) DRIVE CONTROL APPARATUS FOR VEHICLE

(75) Inventors: Tadayoshi Okada, Shioya-gun (JP); Toshiaki Arai, Utsunomiya (JP); Hisaya Izawa, Utsunomiya (JP); Makoto Matsumoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 793 days.

(21) Appl. No.: 11/205,801

(22) Filed: Aug. 16, 2005

(65) Prior Publication Data

US 2006/0052926 A1    Mar. 9, 2006

(30) Foreign Application Priority Data

Aug. 20, 2004   (JP)   ............... 2004-240694

(51) Int. Cl.
G06F 17/00   (2006.01)

(52) U.S. Cl. ............... 701/96; 701/70; 701/51

(58) Field of Classification Search ............... 701/51, 701/96, 300–302, 70; 340/435–436, 438
See application file for complete search history.

(56) References Cited

U.S. PATENT DOCUMENTS 4,871,215 A   10/1989   Takayama

| | | | |
|---|---|---|---|
| 6,430,494 B1 * | 8/2002 | Inoue et al. | 701/96 |
| 6,769,504 B2 * | 8/2004 | Kobayashi et al. | 180/169 |

FOREIGN PATENT DOCUMENTS

| JP | S61-041072 | 3/1986 |
|---|---|---|
| JP | S63-265754 | 11/1988 |
| JP | H05-085319 | 4/1993 |
| JP | 2000-335387 | 12/2000 |
| JP | 2004-130880 | 4/2004 |

* cited by examiner

Primary Examiner—Yonel Beaulieu
(74) Attorney, Agent, or Firm—O'Melveny & Myers LLP

(57) ABSTRACT

A drive control apparatus for a vehicle includes: a follow-up control device; a stop hold device that is capable of holding the vehicle in a stopped state by controlling a brake pressure; and a driving operation detection device that detects at least one of a brake operation and a shift operation to a reverse or neutral position, wherein the follow-up control device cancels the holding of the vehicle in the stopped state by making the stop hold device cancel the holding of the vehicle in the stopped state after holding the vehicle in the stopped state for a predetermined time period or by making the stop hold device gradually reduce the brake pressure when the driving operation detection device detects at least one of the brake operation and the shift operation to the reverse or neutral position while the vehicle is held in the stopped state.

8 Claims, 6 Drawing Sheets

DRIVE CONTROL APPARATUS FOR VEHICLE

BACKGROUND OF THE INVENTION

1. Field of the Invention

The present invention relates to a drive control apparatus for a vehicle.

Priority is claimed on Japanese Patent Application No. 2004-240694, filed Aug. 20, 2004, the content of which is incorporated herein by reference.

2. Description of Related Art

A drive control apparatus for a vehicle is known. Such a drive control apparatus detects a preceding vehicle by means of a vehicle-mounted radar, and controls the speed of the vehicle in the presence of a preceding vehicle such that a predetermined inter-vehicle distance to the preceding vehicle is maintained while maintaining the speed of the vehicle to a predetermined upper limit speed or lower in the absence of a preceding vehicle (see, for example, Japanese Unexamined Patent Application, First Publication No. 2004-130880).

In such a drive control apparatus, while an execution of a speed control, the speed control is canceled in response to a predetermined driving operation made by a driver of the vehicle, such as a depression of the brake pedal, an operation to engage the parking brake, a shift operation of the shift lever into the parking position, the reverse position, or the neutral position, or the like, being detected, as well as a main switch for turning on or off the apparatus being turned off.

However, by simply canceling the execution of the speed control in response to a predetermined driving operation made by the driver, a conventional control apparatus for a vehicle may not be able to control the driving state of the vehicle in a manner consistent with an intention of the driver.

More specifically, the driver may carry out unconsciously or unintentionally some driving operations, such as a depression of the brake pedal, an operation to engage the parking brake, a shift operation of the shift lever into the parking position, the reverse position, or the neutral position, or the like. For example, when a vehicle is in the stopped state in a follow-up control mode while the vehicle is stuck in a traffic jam on an uphill or downhill road, the vehicle may move forward or downward against the driver's intention if the stopped state of the vehicle is canceled in response to the predetermined driving operation unconsciously or unintentionally made by the driver being detected.

SUMMARY OF THE INVENTION

The present invention was conceived in view of the above-mentioned background, and an object thereof is to provide a drive control apparatus for a vehicle that can control the driving state of the vehicle in a manner suitably consistent with an intention of the driver.

In order to achieve the above object by solving the foregoing problems, a drive control apparatus for a vehicle according to a first aspect of the present invention is a drive control apparatus for a vehicle including: a follow-up control device that makes the vehicle travel following a preceding vehicle; a stop hold device that is capable of holding the vehicle in a stopped state by controlling a brake pressure of the vehicle; and a driving operation detection device that detects at least one of a brake operation and a shift operation to a reverse position or a neutral position made by a driver of the vehicle, wherein the follow-up control device cancels the holding of the vehicle in the stopped state by making the stop hold device cancel the holding of the vehicle in the stopped state after holding the vehicle in the stopped state for a predetermined time period or by making the stop hold device gradually reduce the brake pressure when the driving operation detection device detects at least one of the brake operation and the shift operation to the reverse position or the neutral position made by the driver while the vehicle is held in the stopped state by the stop hold device.

According to the drive control apparatus for a vehicle having the above-described configuration, before an execution of a stop hold control is terminated in response to a predetermined operation made by the driver, the stop hold control is not terminated until a predetermined or appropriate time period elapses. Thus, a sudden change in the driving behavior of the vehicle that the driver does not expect is prevented.

Furthermore, a drive control apparatus for a vehicle according to a second aspect of the present invention may further include an alarm device that is capable of outputting an alarm to the driver; and an alarm control device that makes the alarm device output the alarm during a time period between a time when the driving operation detection device detects at least one of the brake operation and the shift operation to the reverse position or the neutral position made by the driver while the vehicle is held in the stopped state by the stop hold device and a time when the holding of the vehicle to the stopped state by the stop hold device is canceled.

According to the drive control apparatus for a vehicle having the above-described configuration, before an execution of a stop hold control is terminated in response to a predetermined operation made by the driver, the stop hold control is not terminated until a predetermined or appropriate time period elapses and an alarm that notifies the driver of this transition is output to the driver. Thus, a sudden change in the driving behavior of the vehicle that the driver does not expect is prevented.

Furthermore, in a drive control apparatus for a vehicle according to a third aspect of the present invention, the driving operation detection device may be capable of detecting an operation on an accelerator made by the driver, and the follow-up control device may cancel the holding of the vehicle to the stopped state by the stop hold device when the driving operation detection device detects the shift operation to the reverse position and the operation of the accelerator made by the driver while the vehicle is held in the stopped state by the stop hold device.

According to the drive control apparatus for a vehicle having the above-described configuration, the execution of the stop hold control is canceled when a shift operation to the reverse position and the operation of the accelerator made by the driver is detected, in other words, when it is determined that the driver has an intention to reverse the vehicle. Thus, it is possible to execute a driving control for a vehicle in a manner consistent with an intention of the driver.

Furthermore, a drive control apparatus for a vehicle according to a fourth aspect of the present invention is a drive control apparatus for a vehicle including: a follow-up control device that makes the vehicle travel following a preceding vehicle; a stop hold device that is capable of holding the vehicle in a stopped state by controlling a brake pressure of the vehicle; and a start detection device that detects a request to start the vehicle made by a driver of the vehicle or a start of the preceding vehicle; a stop cancel device that cancels the holding of the vehicle to the stopped state when the start detection device detects the request to start the vehicle made by the driver or the start of the preceding vehicle while the vehicle is held in the stopped state by the stop hold device; a driving operation detection device that detects at least one of a brake operation and a shift operation to a reverse position or a neutral position made by the driver; and an alarm device that is capable of outputting an alarm to the driver, wherein when the start detection device detects the request to start the vehicle made by the driver or the start of the preceding vehicle and when the driving operation detection device detects at least one of the brake operation and the shift operation to the reverse position or the neutral position made by the driver while the vehicle is held in the stopped state by the stop hold device, the follow-up control device prohibits the holding of the vehicle to the stopped state by the stop cancel device to be canceled and makes the alarm device output an alarm prompting driver to cancel the brake operation made by the driver or to make the shift operation to the drive position.

According to the drive control apparatus for a vehicle having the above-described configuration, the stop hold control for holding the vehicle in the stopped state is prevented from being canceled in response to an unconscious or unintentional driving operation made by the driver, for example, while the stop hold control is executed. Thus, it is possible to execute a driving control for a vehicle in a manner consistent with an intention of the driver.

In addition, for example, when an execution of the stop hold control is canceled and the follow-up control is executed in response to a certain event, such as a start of the preceding vehicle, by outputting an alarm for confirming an intention of the driver, an unexpected control operation is prevented from being executed in response to an operation by the driver.

Furthermore, in a drive control apparatus for a vehicle according to a fifth aspect of the present invention, the follow-up control device may cancel the holding of the vehicle to the stopped state when the driving operation detection device detects that a requested brake pressure that is related to a brake operation made by the driver becomes equal to or more than a predetermined commanded brake pressure while the vehicle is held in the stopped state by the stop hold device.

According to the drive control apparatus for a vehicle having the above-described configuration, it is possible to confirm the true intention of the driver whether he or she intends to stop the vehicle before the execution of the stop hold control is canceled. Thus, the vehicle is prevented from executing a driving operation against the driver's intention.

Furthermore, in a drive control apparatus for a vehicle according to a sixth aspect of the present invention, the predetermined commanded brake pressure may be a brake pressure that is sufficient that to hold the vehicle in the stopped state.

According to the drive control apparatus for a vehicle having the above-described configuration, the vehicle is prevented from moving against the driver's intention to hold the vehicle in the stopped state when the execution of the stop hold control is canceled.

As described above, according to the drive control apparatus for a vehicle of the first aspect of the present invention, when an execution of a stop hold control is terminated in response to a predetermined operation made by the driver, a sudden change in the driving behavior of the vehicle that the driver does not expect is prevented.

Furthermore, according to the drive control apparatus for a vehicle of the second aspect of the present invention, the driver is notified of a termination of the execution of the stop hold control in response to a predetermined driving operation made by the driver.

Furthermore, according to the drive control apparatus for a vehicle of the third aspect of the present invention, the execution of the stop hold control is canceled when it is determined that the driver has an intention to reverse the vehicle. Thus, it is possible to execute a driving control for a vehicle in a manner consistent with an intention of the driver.

Furthermore, according to the drive control apparatus for a vehicle of the fourth aspect of the present invention, the stop hold control for holding the vehicle in the stopped state is prevented from being canceled in response to an unconscious or unintentional driving operation made by the driver, for example, while the stop hold control is executed. Thus, it is possible to execute a driving control for a vehicle in a manner consistent with an intention of the driver.

In addition, for example, when an execution of the stop hold control is canceled and the follow-up control is executed in response to a certain event, such as a start of the preceding vehicle, by outputting an alarm for confirming an intention of the driver, an unexpected control operation is prevented from being executed in response to an operation by the driver.

Furthermore, according to the drive control apparatus for a vehicle of the fifth aspect of the present invention, it is possible to confirm the true intention of the driver whether he or she intends to stop the vehicle before the execution of the stop hold control is canceled. Thus, the vehicle is prevented from executing a driving operation against the driver's intention.

Furthermore, according to the drive control apparatus for a vehicle of the sixth aspect of the present invention, the vehicle is prevented from moving against the driver's intention to hold the vehicle in the stopped state when the execution of the stop hold control is canceled.

DETAILED DESCRIPTION OF THE INVENTION

Hereinafter, a drive control apparatus for a vehicle according to an embodiment of the present invention will be described with reference to the drawings.

Figure 1:
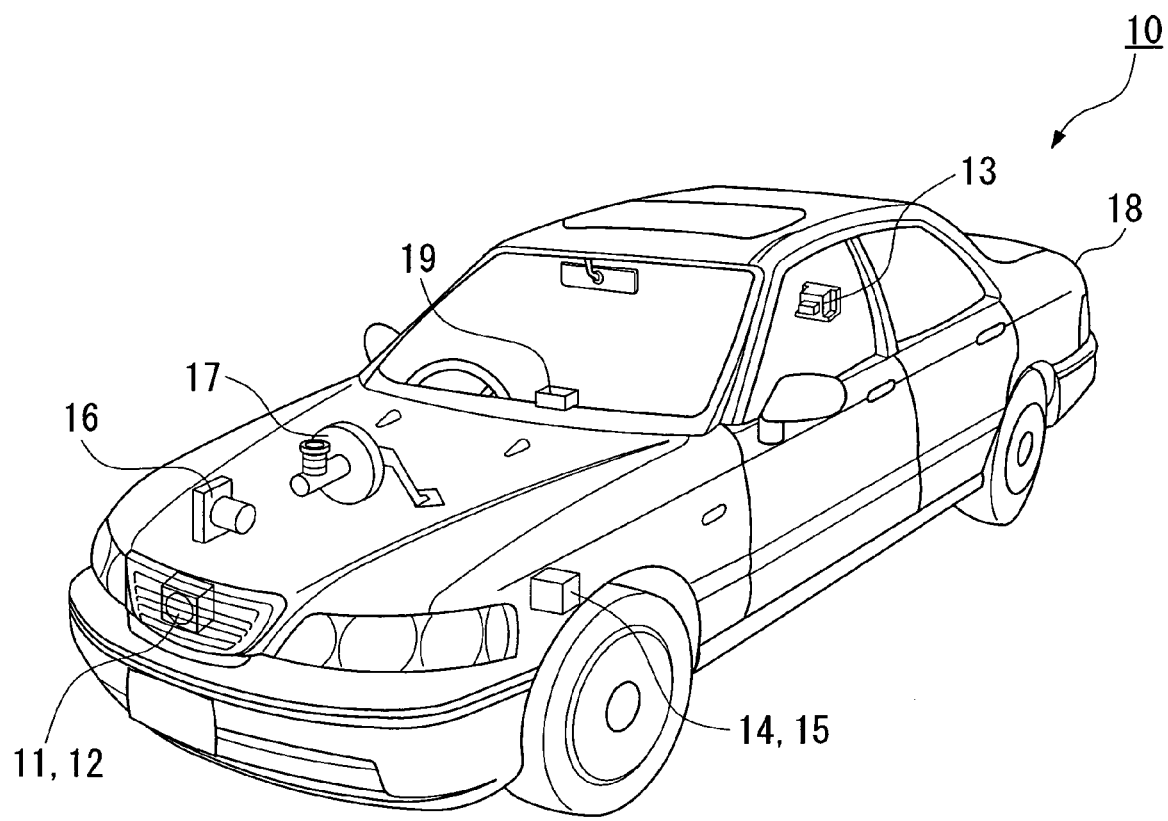
FIG. 1 is a diagram illustrating a vehicle according to an embodiment of the present invention.
Figure 2:
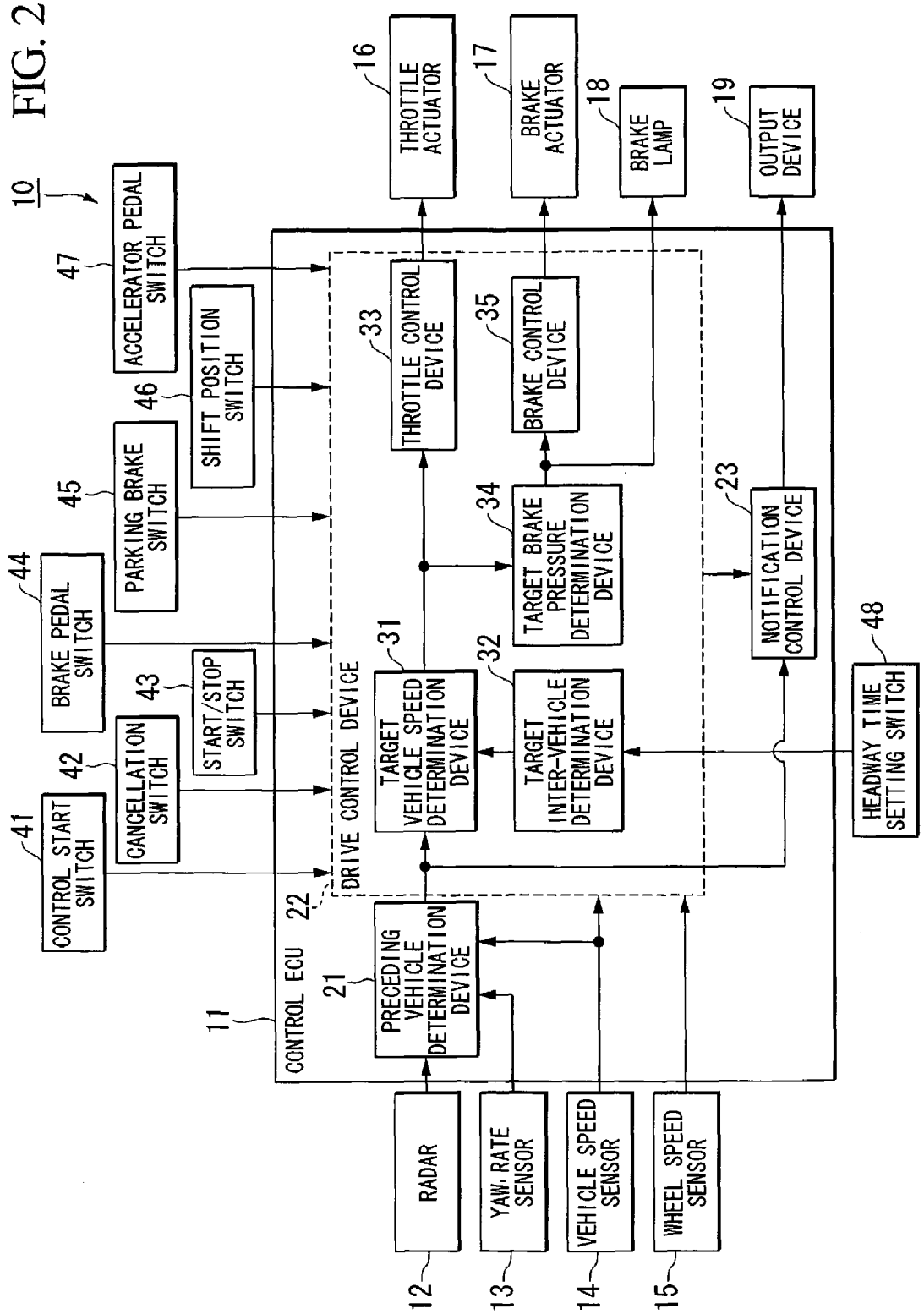
FIG. 2 is a schematic diagram illustrating a drive control apparatus for a vehicle according to an embodiment of the present invention.

Referring to FIGS. 1 and 2, a drive control apparatus 10 for a vehicle according to this embodiment is shown. As shown in FIGS. 1 and 2, the drive control apparatus 10 for a vehicle may include a control ECU (electrical control unit) 11, a radar 12, a yaw rate sensor 13, a vehicle speed sensor 14, a wheel speed sensor 15, a throttle actuator 16, a brake actuator 17, a brake lamp 18, and an output device 19, for example.

The radar 12 may be a millimeter-wave radar, for example, and the control ECU 11 and the radar 12 may be integrated and are provided in a nose portion of the body of the vehicle, for example, as shown in FIG. 1. The radar 12 transmits millimeter waves forward of the vehicle, and receives waves reflected by an object that is present in front of the vehicle to generate beats signal by mixing the reflected signals and the transmitted signals. The control ECU 11 calculates a distance to the detected targeted object within the predetermined detection area, the relative speed with respect to the object, and the like, based on the frequency of these beat signals, and determines the position of detected targeted object based on the direction to which the reflected millimeter waves had been transmitted.

The yaw rate sensor 13 may be provided in the vicinity of the rear axle, for example, and include a piezo-electric element, a gyroscopic sensor, and the like, for detecting the orientation of the vehicle on a horizontal surface or the difference in angles of tilt of the vehicle with respect to a vertical axis. The yaw rate sensor 13 detects the yaw rate that is the angular speed of rotation of the center of gravity of the vehicle about the vertical axis, and sends a signal corresponding to the detection result to the control ECU 11.

The vehicle speed sensor 14 detects the travel speed of the vehicle (vehicle speed), and sends a signal corresponding to the detection result to the control ECU 11.

The wheel speed sensor 15 detects the wheel speed of the vehicle, and sends a signal corresponding to the detection result to the control ECU 11.

The throttle actuator 16 controls the degree of opening of the throttle or the like based on a control signal sent from the control ECU 11, for example, to accelerate or decelerate the vehicle.

The brake actuator 17 controls the brake fluid pressure or the like based on a control signal sent from the control ECU 11, for example, to decelerate the vehicle.

The brake lamp 18 that is turned on or off according to an operation state of the brake is provided on the rear of the vehicle.

Furthermore, the output device 19 is a liquid crystal output device, a speaker, or the like, provided on an instrument panel of the vehicle, for example, that outputs various types of information or alarms, or the like, sent from the control ECU 11 by means of a visual indication, a sound indication, an alarm sound, etc.

The control ECU 11 may be configured to include a preceding vehicle determination device 21, a driving control device 22, and a notification control device 23, for example. If an object is detected within the predetermined detection area of the radar 12, a determination is made as to whether or not a preceding vehicle that the vehicle should follow is detected. When a preceding vehicle is detected, the control ECU 11 controls the speed of the vehicle by controlling the operations of the throttle actuator 16 and the brake actuator 17 such that the vehicle drives following the preceding vehicle according to an appropriate state of the movement of the preceding vehicle, including the stopped state. For example, the speeds of the vehicle is controlled so that a predetermined target inter-vehicle distance is maintained at a speed equal to or lower than a predetermined upper limit speed. In addition, the control ECU 11 instructs the output device 19 to output various types of information, or alarms, or the like, by means of a visual indication, a sound indication, an alarm sound, etc. On the other hand, when no preceding vehicle is detected, the control ECU 11 controls the speed of the vehicle so that a predetermined setting speed is maintained.

The preceding vehicle determination device 21 sets a detection targeted object detected within a predetermined detection area of the radar 12, for example, as a candidate preceding vehicle to which the vehicle is to follow, and determines whether the selected preceding vehicle is an moving objects or a resting object.

Furthermore, the preceding vehicle determination device 21 estimates the travel locus of the vehicle based on the yaw rate of the vehicle detected by the yaw rate sensor 13 and the speed of the vehicle (vehicle speed) detected by the vehicle speed sensor 14, for example. In this estimation process, the speed "v" and the yaw rate "y" of the vehicle is used to determine the curvature "r" of a corner R ($r=v/y$), and sets an area that is determined from a locus defined by the corner R and a predetermined lane width as a travel locus of the vehicle, for example.

The preceding vehicle determination device 21 then selects one of a plurality of candidate preceding vehicles that are present within the estimated travel locus of the vehicle as a preceding vehicle that the vehicle is to follow according to priorities based on the distance from the vehicle, the relative speed with respect to the vehicle, or the like, for example.

The driving control device 22 is adapted to execute a speed control of the vehicle by selecting one control mode from a plurality of modes: a follow-up control, a stop hold control, or an OFF control, for example, according to the presence or absence of a preceding vehicle determined by the preceding vehicle determination device 21. The driving control device 22 is configured to include, for example, a target vehicle speed determination device 31, a target inter-vehicle determination device 32, a throttle control device 33, a target brake pressure determination device 34, and a brake control device 35. The driving control device 22 receives various signals sent by a control start switch 41, a cancellation switch 42, a start/stop switch 43, a brake pedal switch 44, a parking brake switch 45, a shift position switch 46, an accelerator pedal switch 47, and a headway time setting switch 48.

It should be noted that, in the follow-up control, modes may be switched between two modes: a low speed following (LSF) in a relatively low vehicle speed region in which the vehicle can be started or stopped following the preceding vehicle; and an adaptive cruise control (ACC) mode at relatively high vehicle speed region in which the vehicle is not required to be started or stopped following the preceding vehicle.

Then, if the vehicle stops while maintaining a predetermined final inter-vehicle distance from the preceding vehicle in response to the preceding vehicle stopping while the low speed following is executed, the stop hold control is executed according to predetermined conditions and the vehicle is held in the stopped state.

Furthermore, in the OFF control, an execution of the follow-up control and the stop hold control is canceled according to predetermined conditions.

The target vehicle speed determination device 31 sets a target vehicle speed with respect to the speed of the vehicle (vehicle speed) based on the presence or absence of a preceding vehicle determined by the preceding vehicle determination device 21, and in the presence of a preceding vehicle, various types of information, such as the distance between the vehicle and the preceding vehicle, the relative speed therebetween, and the target inter-vehicle distance sent from the target inter-vehicle determination device 32. The target vehicle speed determination device 31 then outputs control signals to the throttle control device 33 and the target brake pressure determination device 34 for setting the vehicle speed of the vehicle to the target vehicle speed that has been set.

The target inter-vehicle determination device 32 sets a target inter-vehicle distance, based on a predetermined headway time sent from the headway time setting switch 48 in response to a driver's operation, i.e., the time required by the vehicle to catch up with the preceding vehicle and the vehicle speed of that vehicle, and sends the target inter-vehicle distance to the target vehicle speed determination device 31.

It should be noted that the headway time can be set by the driver by means of an input operation of the headway time setting switch 48, and is set to a predetermined time period required to maintain at least the predetermined inter-vehicle distance from the preceding vehicle.

Furthermore, the throttle control device 33 sets the degree of opening of the throttle that corresponds to an acceleration or deceleration operation for setting the vehicle speed of the vehicle to the target vehicle speed according to the target vehicle speed set by the target vehicle speed determination device 31, and controls the operation of the throttle actuator 16 accordingly.

Furthermore, the target brake pressure determination device 34 sets a target brake pressure that corresponds to a deceleration operation for setting the vehicle speed of the vehicle to the target vehicle speed according to the target vehicle speed set by the target vehicle speed determination device 31, and the brake control device 35 controls the operation of the brake actuator 17 according to the target brake pressure set by the target brake pressure determination device 34.

Switches 41, 42, 43, and 48 are provided in a predetermined position, for example, in the vicinity of the steering wheels in front of the driver's seat, and each of the switches 41, 42, 43, and 48 sends respective signals corresponding to driving operations made by the driver to the driving control device 22 in the control ECU 11.

The control start switch 41 outputs a signal requesting to start an execution of the follow-up control according to an input operation made by the driver.

The cancellation switch 42 outputs a signal requesting to terminate an execution of the follow-up control and the stop hold control according to an input operation made by the driver.

The start/stop switch 43 outputs a signal requesting to start or stop the vehicle according to an input operation made by the driver.

The brake pedal switch 44 detects the operation state of the brake pedal (not shown) made by the driver, i.e., whether the brake pedal is depressed or released and to what degree brake pedal is depressed, and outputs the detection results to the driving control device 22.

The parking brake switch 45 detects the operation state of the parking brake (not shown) made by the driver, i.e., whether or not the parking brake is engaged, and outputs the detection result to the driving control device 22.

The shift position switch 46 detects the operation state of the shift lever (not shown) made by the driver, i.e., the position of the shift lever, and outputs the detection result to the driving control device 22.

The accelerator pedal switch 47 detects the operation state of the accelerator pedal (not shown) by an occupant of the vehicle, i.e., whether the accelerator pedal is depressed or released and to what degree accelerator pedal is depressed, and outputs the detection results to the driving control device 22.

Furthermore, the notification control device 23 controls a display of various types of information or alarms on the output device 19 according to the presence or absence of a preceding vehicle determined by the preceding vehicle determination device 21 and the control signals sent by the driving control device 22, for example.

The drive control apparatus 10 for a vehicle according to this embodiment has the foregoing configuration. Next, operations of the drive control apparatus 10 for a vehicle will be explained with reference to the drawings.

First, an operational flow for canceling an execution of the follow-up control and the stop hold control in response to a predetermined driving operation made by the driver will be described.

Figure 3:
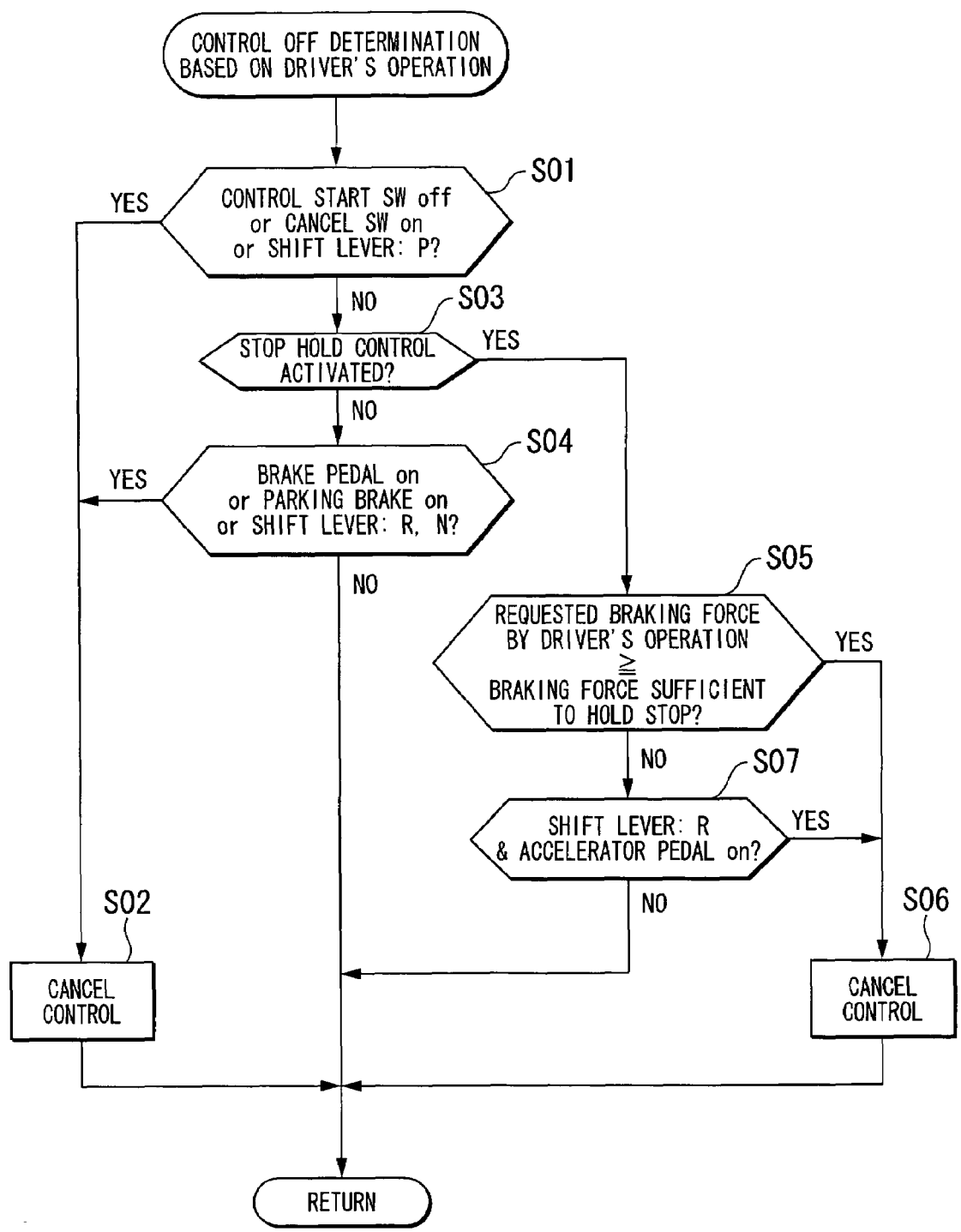
FIG. 3 is a flowchart showing the operation of the drive control apparatus for a vehicle shown in FIG. 2.

First, in step S01 shown in FIG. 3, it is determined whether or not any of the following conditions holds: the control start switch (control start SW) 41 is in the OFF state, or the cancellation switch (cancel SW) 42 is in the ON state, or the shift lever is in the parking (P) position.

When this determination is evaluated as "YES," the flow proceeds to step S02 in which the OFF control is executed to cancel or prohibit an execution of the follow-up control and the stop hold control, and the series of processing is terminated.

On the other hand, when this determination is evaluated as "NO," the flow proceeds to step S03.

In step S03, it is determined whether or not the stop hold control is being executed.

When this determination is evaluated as "YES," the flow proceeds to step S05 that will be explained later.

On the other hand, when this determination is evaluated as "NO," i.e., the follow-up control is being executed, the flow proceeds to step S04.

Then, in step S04, it is determined whether or not any of the following conditions holds: the brake pedal switch 44 is in the ON state, or the parking brake switch 45 is in the ON state, or the shift lever is in the reverse (R) position or in the neutral (N) position.

When the determination is evaluated as "YES" in step S04, the flow proceeds to step S02 that has been described above.

On the other hand, when the determination is evaluated as "NO" in step S04, the series of processing is terminated.

In step S05, on the other hand, it is determined whether or not the requested braking force (for example, a requested brake pressure or the like) that is related to a brake operation made by the driver is equal to or more than a predetermined braking force required to hold the vehicle in the stopped state (for example, a predetermined commanded brake pressure or the like).

When this determination is evaluated as "YES," i.e., when it is determined that it is possible to hold the vehicle in the stopped state with a braking force that is generated according to the braking force requested by the driver even if the stop hold control that is currently executed is canceled, the flow proceeds to step S06 in which the OFF control is executed, and the series of processing is terminated.

On the other hand, when this determination is evaluated as "NO," i.e., when it is determined that it is not possible to hold the vehicle in the stopped state if the stop hold control that is currently executed is canceled, the flow proceeds to step S07.

In step S07, it is determined whether the shift lever is in the reverse (R) position, and the accelerator pedal switch 47 is in the ON state.

When this determination is evaluated as "YES" in step S07, i.e., it is determined that the driver has an intention to reverse the vehicle, the flow proceeds to step S06 that has been described above.

On the other hand, when this determination is evaluated as "NO" in step S07, i.e., it is determined that the driver has no intention to reverse the vehicle, the series of processing is terminated without the stop hold control that is currently executed being canceled.

Hereinafter, an operational flow for starting the vehicle while the stop hold control is executed will be described.

Figure 4:
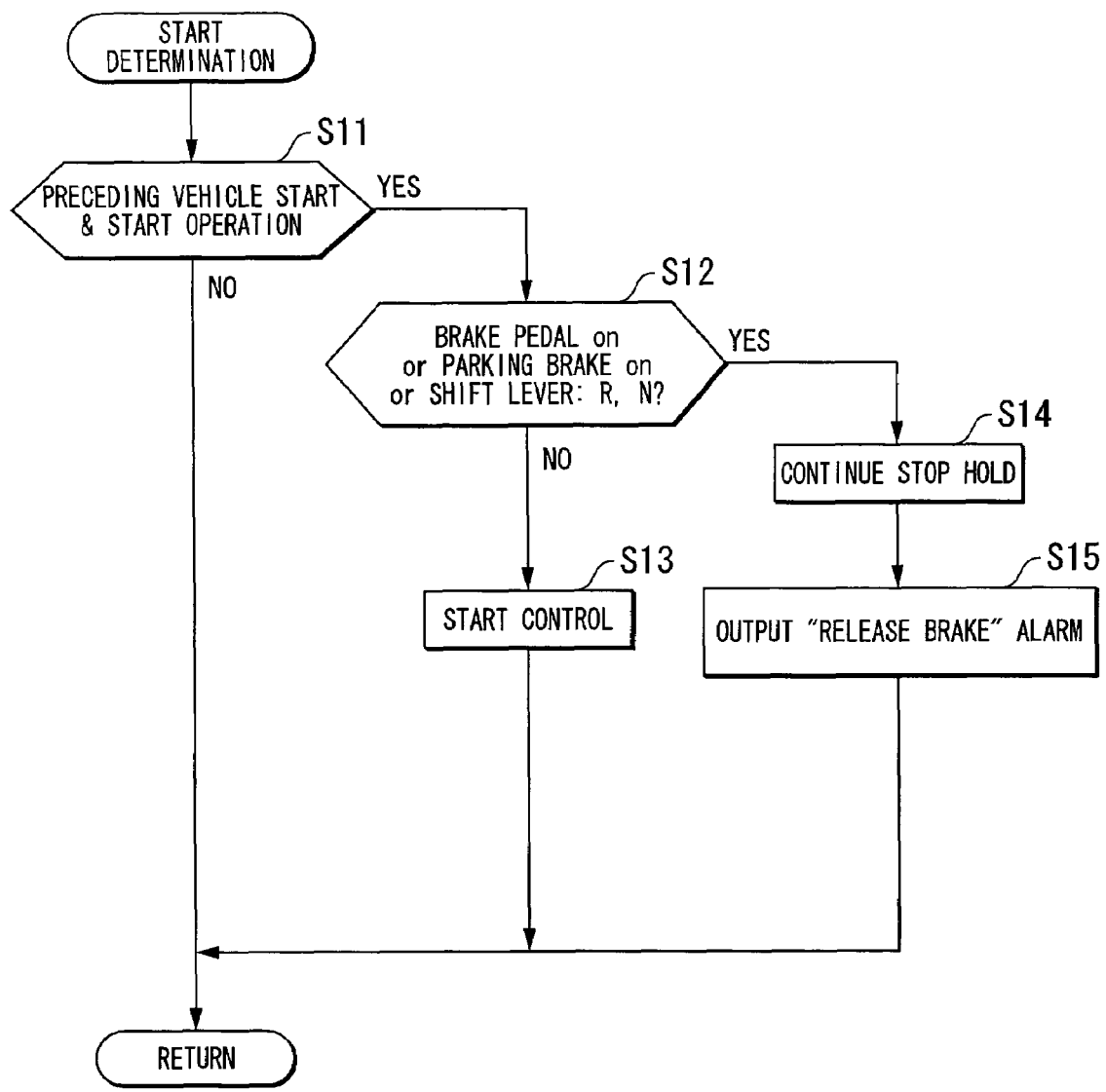
FIG. 4 is a flowchart showing the operation of the drive control apparatus for a vehicle shown in FIG. 2.

First, in step S11 shown in FIG. 4, for example, it is determined whether or not a start of vehicle is instructed by the driver or a start of the preceding vehicle is detected.

When this determination is evaluated as "NO," the series of processing is terminated.

On the other hand, when this determination is evaluated as "YES," the flow proceeds to step S12.

In step S12, it is determined whether or not any of the following conditions holds: the brake pedal switch 44 is in the ON state, or the parking brake switch 45 is in the ON state, or the shift lever is in the reverse (R) position or in the neutral (N) position.

When this determination is evaluated as "YES" in step S12, i.e., when it is determined that the driver carries out a driving operation that prohibits the vehicle from being started, the flow proceeds to step S14 that will be described later.

On the other hand, when this determination is evaluated as "NO" in step S12, i.e., when it is determined that the driver is not executing a driving operation that prohibits the vehicle from being started, the flow proceeds to step S13 in which a start control for starting the vehicle is executed, and the series of processing is terminated.

In step S14, on the other hand, the execution of the stop hold control is continued.

Then, in step S15, an alarm that notifies the driver to cancel the brake operation that has been made by the driver or to change the shift lever to the drive position is issued, and the series of processing is terminated.

For example, the alarm that notifies the driver to cancel the brake operation that has been made by the driver is the message "release the brake" or the like is output as a visual message or an audible message.

As described above, according to the drive control apparatus 10 for a vehicle of this embodiment, the stop hold control for holding the vehicle in the stopped state is prevented from being canceled in response to an unconscious or unintentional driving operation made by the driver, for example, while the stop hold control is executed. Thus, it is possible to execute a driving control for a vehicle in a manner consistent with an intention of the driver.

In addition, for example, when an execution of the stop hold control is canceled and the follow-up control is executed in response to a certain event, such as a start of the preceding vehicle, by outputting an alarm for confirming an intention of the driver, an unexpected control operation is prevented from being executed in response to an operation by the driver.

Hereinafter, an alternative operational flow for canceling the follow-up control and the stop hold control in response to a predetermined driving operation made by the driver will be described as a variation of the embodiment described above.

Figure 5:
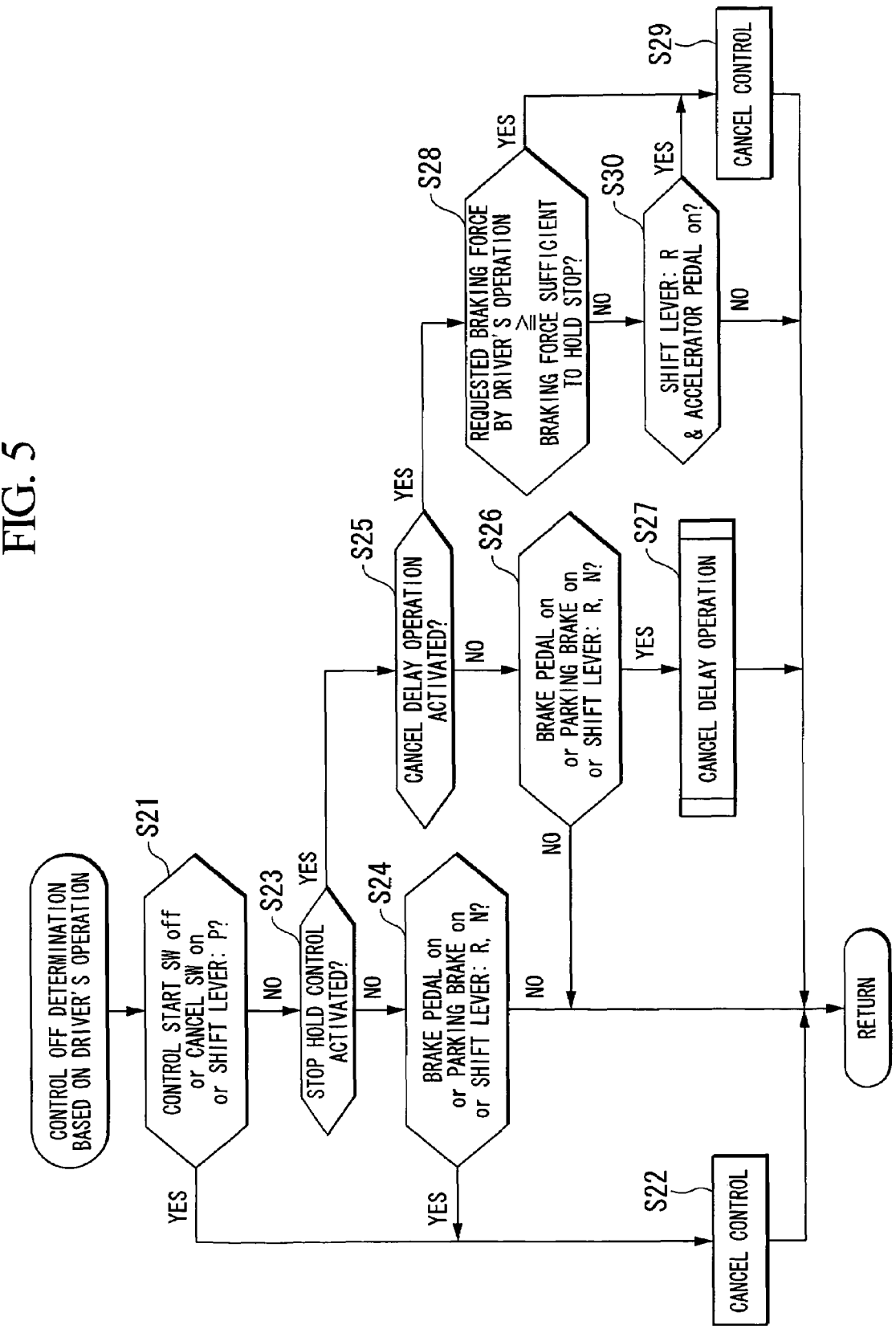
FIG. 5 is a flowchart showing the operation of a drive control apparatus for a vehicle according to a variation of this embodiment.

First, in step S21 shown in FIG. 5, it is determined whether or not any of the following conditions holds: the control start switch (control start SW) 41 is in the OFF state, or the cancellation switch (cancel SW) 42 is in the ON state, or the shift lever is in the parking (P) position.

When the determination is evaluated as "YES," the flow proceeds to step S22 in which the OFF control is executed to cancel or prohibit an execution of the follow-up control and the stop hold control, and the series of processing is terminated.

On the other hand, when the determination is evaluated as "NO," the flow proceeds to step S23.

In step S23, it is determined whether or not the stop hold control is being executed.

When the determination is evaluated as "YES," the flow proceeds to step S25 that will be explained later.

On the other hand, when the determination is evaluated as "NO," i.e., the follow-up control is being executed, the flow proceeds to step S24.

Then, in step S24, it is determined whether or not any of the following conditions holds: the brake pedal switch 44 is in the ON state, or the parking brake switch 45 is in the ON state, or the shift lever is in the reverse (R) position or in the neutral (N) position.

When the determination is evaluated as "YES" in step S24, the flow proceeds to step S22 that has been described above.

On the other hand, when the determination is evaluated as "NO" in step S24, the series of processing is terminated.

In step S25, on the other hand, it is determined whether or not a cancel delay operation that will be described later is being executed.

When the determination is evaluated as "YES," the flow proceeds to step S28 that will be explained later.

On the other hand, when the determination is evaluated as "NO," the flow proceeds to step S26.

Then, in step S26, it is determined whether or not any of the following conditions holds: the brake pedal switch 44 is in the ON state, or the parking brake switch 45 is in the ON state, or the shift lever is in the reverse (R) position or in the neutral (N) position.

On the other hand, when the determination is evaluated as "NO" in step S26, the series of processing is terminated.

When the determination is evaluated as "YES" in step S26, the flow proceeds to step S27.

Then, in step S27, the cancel delay operation is executed, and the series of processing is terminated.

In step S28, on the other hand, it is determined whether or not the requested braking force (for example, a requested brake pressure or the like) that is related to a brake operation made by the driver is equal to or more than a predetermined braking force required to hold the vehicle in the stopped state (for example, a predetermined commanded brake pressure or the like).

When this determination is evaluated as "YES," i.e., when it is determined that it is possible to hold the vehicle in the stopped state using a braking force that is generated according to the braking force requested by the driver even when the stop hold control that is currently executed is canceled, the flow proceeds to step S29 in which the OFF control is executed, and the series of processing is terminated.

On the other hand, when this determination is evaluated as "NO," i.e., when it is determined that it is not possible to hold the vehicle in the stopped state if the stop hold control that is currently executed is canceled, the flow proceeds to step S30.

In step S30, it is determined whether the shift lever is in the reverse (R) position, and the accelerator pedal switch 47 is in the ON state.

When this determination is evaluated as "YES" in step S30, i.e., it is determined that the driver has an intention to reverse the vehicle, the flow proceeds to step S29 that has been described above.

On the other hand, when this determination is evaluated as "NO" in step S30, i.e., it is determined that the driver has no intention to reverse the vehicle, the series of processing is terminated without the stop hold control that is currently executed being canceled.

Hereinafter, the cancel delay operation in the above-described step S27 will be described.

In the cancel delay operation, while the vehicle is held in the stopped state by executing the stop hold control, when a brake operation made by the driver or a shift operation to the reverse position or the neutral position made by the driver is detected, the hold stop of the vehicle is canceled by executing the OFF control and reducing a commanded controlled pressure for the brake pressure to a predetermined value after the execution of the stop hold control is continued and the vehicle is held in the stopped state for a predetermined time period; or alternatively, the hold stop of the vehicle is canceled by gradually reducing a commanded controlled pressure for the brake pressure to a predetermined value, for example.

For example, when the stop hold control is executed (for example, any given time prior to time t01 shown in FIG. 6), the commanded controlled pressure for the brake pressure (commanded controlled brake pressure) is set to a predetermined commanded brake pressure P01 that is required to hold the vehicle in the stopped state.

At time t01, for example, when the brake pedal switch 44 is switched from the OFF state to the ON state in response to an unconscious or unintentional driving operation by the driver, an alarm that notifies the driver of a start of the execution of the cancel delay operation is output.

Then, during the time period between time t01 and time t02 when a predetermined delay time elapses, if the requested braking force that is related to the brake operation made by the driver (the brake pressure requested by the driver) drops below the predetermined commanded brake pressure P01, the commanded controlled pressure for the brake pressure is maintained to the predetermined commanded brake pressure P01.

Then, during the time period between time t02 and time t03 when any given time elapses, the commanded controlled pressure for the brake pressure is gradually reduced from the predetermined commanded brake pressure P01 to another predetermined commanded brake pressure P02 (P02<P01) at which the stop hold of the vehicle is canceled. At time t03 when the commanded controlled pressure for the brake pressure reaches to the predetermined commanded brake pressure P02, the OFF control is executed to stop the execution of the cancel delay operation and the output of the alarm is stopped.

It should be noted that the actual value of the brake pressure (actual pressure) is controlled so that it equals the greater one of the commanded controlled pressure and the requested brake pressure. Therefore, the actual value of the brake pressure is set such that it equals to requested brake pressure when the commanded controlled pressure is gradually decreased and becomes the requested brake pressure or less at any given time subsequent to time t04 shown in FIG. 6, for example, or when the requested brake pressure is increased relatively suddenly in response to an intentional brake operation made by the driver and becomes equal to or greater than the commanded controlled pressure that has been maintained to the predetermined commanded brake pressure P01 at any given time subsequent to time t12, shown in FIG. 7, for example.

Figure 6:
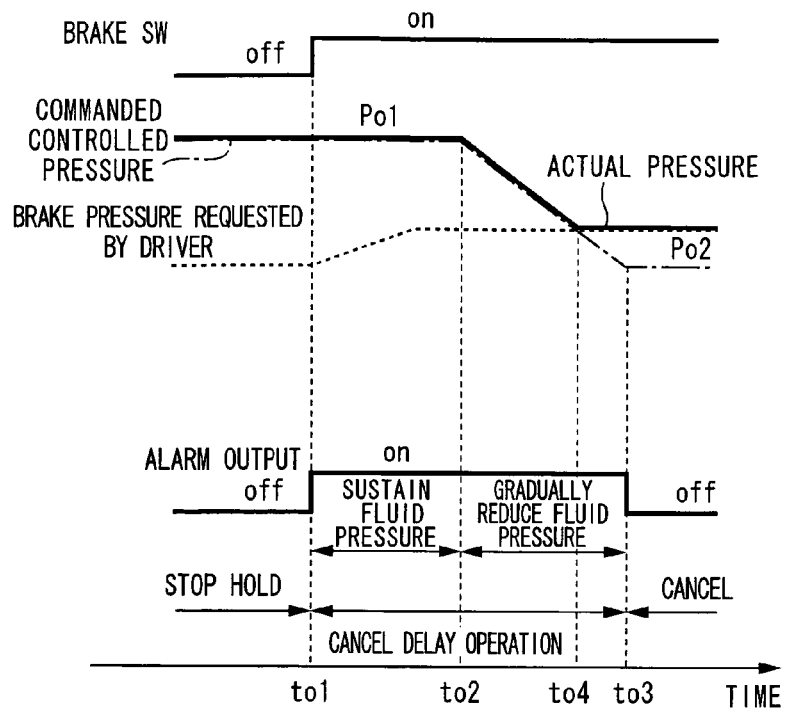
FIG. 6 is a graph illustrating changes in the commanded controlled pressure, the requested brake pressure, the actual pressure, and an alarm output over time in a cancel delay operation shown in FIG. 5.
Figure 7:
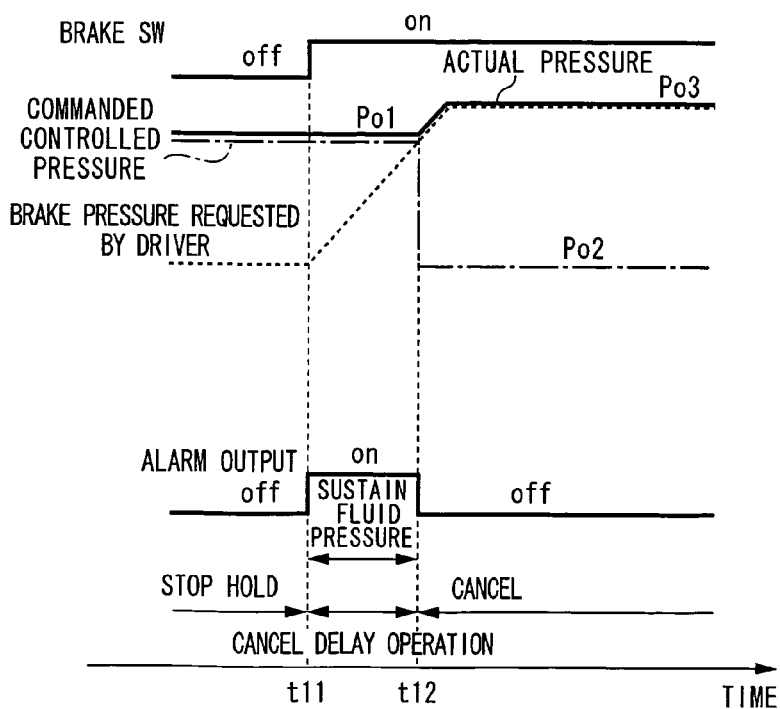
FIG. 7 is a graph illustrating changes in the commanded controlled pressure, the requested brake pressure, the actual pressure, and an alarm output over time in the cancel delay operation shown in FIG. 5.

Furthermore, after the requested brake pressure reaches the commanded controlled pressure at any given time subsequent to time t04 shown in FIG. 6, for example, the operation for gradually reducing the commanded controlled pressure may be continued. Alternatively, for example, the execution of the cancel delay operation may be terminated and the output of the alarm may be stopped by instantaneously decreasing the brake pressure to the predetermined commanded brake pressure P02 at which the stop hold of the vehicle is canceled at any given time subsequent to time t12, shown in FIG. 7, for example.

According to the drive control apparatus 10 for a vehicle of this variation, when the control mode is transitioned from the stop hold control to the OFF control by executing the cancel delay operation in response to a predetermined driving operation made by the driver, a predetermined or appropriate wait time is provided and an alarm that notifies the driver of this transition is output to the driver. Thus, a sudden change in the driving behavior of the vehicle that the driver does not expect is prevented.

In the above-described embodiment, for example, the commanded controlled pressure for the brake pressure is maintained to the predetermined commanded brake pressure P01 during the time period between time t01 and time t02 when the predetermined delay time elapses as shown in FIG. 6. However, the present invention is not limited to this embodiment, and the processing to maintain the brake pressure to the predetermined commanded brake pressure P01 may be omitted. Subsequent to time t01, the commanded controlled pressure for the brake pressure be gradually reduced from the predetermined commanded brake pressure P01 to the predetermined commanded brake pressure P02 (P02<P01).

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A drive control apparatus for an actual vehicle comprising:
   a follow-up control device that makes the actual vehicle travel following a preceding vehicle;
   a stop hold device that is capable of holding the actual vehicle in a stopped state by controlling a brake pressure of the actual vehicle; and
   a driving operation detection device that detects at least one of a brake operation and a shift operation to a reverse position or a neutral position made by a driver of the actual vehicle,
   wherein the follow-up control device cancels the holding of the actual vehicle in the stopped state by making the stop hold device cancel the holding of the actual vehicle in the stopped state after holding the actual vehicle in the stopped state for a predetermined time period or by making the stop hold device gradually reduce the brake pressure when the driving operation detection device detects at least one of the brake operation and the shift operation to the reverse position or the neutral position made by the driver while the actual vehicle is in the stopped state by the stop hold device.

2. The drive control apparatus for an actual vehicle according to claim 1, further comprising:
   an alarm device that is capable of outputting an alarm to the driver; and
   an alarm control device that makes the alarm device output the alarm during a time period between a time when the driving operation detection device detects at least one of the brake operation and the shift operation to the reverse position or the neutral position made by a driver while the actual vehicle is held in the stopped state by the stop hold device and a time when the holding of the actual vehicle to the stopped state by the stop hold device is canceled.

3. The drive control apparatus for an actual vehicle according to claim 1, wherein the driving operation detection device is capable of detecting an operation on an accelerator made by the driver, and the follow-up control device cancels the holding of the actual vehicle in the stopped state by the stop hold device when the driving operation detection device detects the shift operation to the reverse position and the operation of the accelerator made by the driver while the actual vehicle is held in the stopped state by the stop hold device.

4. The drive control apparatus for an actual vehicle according to claim 1, wherein the follow-up control device cancels holding the actual vehicle to the stopped state when the driving operation detection device detects that a requested brake pressure that is related to a brake operation made by the driver becomes equal to or more than a predetermined commanded brake pressure while the actual vehicle is held in the stopped state by the stop hold device.

5. The drive control apparatus for an actual vehicle according to claim 4, wherein the predetermined commanded brake pressure is a brake pressure that is sufficient that to hold the actual vehicle in the stopped state.

6. A drive control apparatus for a vehicle comprising:
a follow-up control device that makes the vehicle travel following a preceding vehicle;
a stop hold device that is capable of holding the vehicle in a stopped state by controlling a brake pressure of the vehicle; and
a start detection device that detects a request to start the vehicle made by a driver of the vehicle or a start of the preceding vehicle;
a stop cancel device that cancels the holding of the vehicle to the stopped state when the start detection device detects the request to start the vehicle made by the driver or the start of the preceding vehicle while the vehicle is held in the stopped state by the stop hold device;
a driving operation detection device that detects at least one of a brake operation and a shift operation to a reverse position or a neutral position made by the driver; and
an alarm device that is capable of outputting an alarm to the driver,
wherein when the start detection device detects the request to start the vehicle made by the driver or the start of the preceding vehicle and when the driving operation detection device detects at least one of the brake operation and the shift operation to the reverse position or the neutral position made by the driver while the vehicle is held in the stopped state by the stop hold device, the follow-up control device prohibits the holding of the vehicle to the stopped state by the stop cancel device to be canceled and makes the alarm device output an alarm prompting driver to cancel the brake operation made by the driver or to make the shift operation to the drive position.

7. The drive control apparatus for a vehicle according to claim 6, wherein the follow-up control device cancels holding the vehicle to the stopped state when the driving operation detection device detects that a requested brake pressure that is related to a brake operation made by the driver becomes equal to or more than a predetermined commanded brake pressure while the vehicle is held in the stopped state by the stop hold device.

8. The drive control apparatus for a vehicle according to claim 7, wherein the predetermined commanded brake pressure is a brake pressure that is sufficient that to hold the vehicle in the stopped state.

* * * * *